(12) United States Patent
Kang et al.

(10) Patent No.: US 12,423,533 B2
(45) Date of Patent: Sep. 23, 2025

(54) RECEPTION CIRCUIT AND SMART CARD INCLUDING THE SAME

(71) Applicant: Samsung Electronics Co., Ltd., Suwon-si (KR)

(72) Inventors: Minhyeok Kang, Suwon-si (KR); Sanghyo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/370,118

(22) Filed: Sep. 19, 2023

(65) Prior Publication Data

US 2024/0330613 A1   Oct. 3, 2024

(30) Foreign Application Priority Data

Mar. 29, 2023   (KR) .................. 10-2023-0041568

(51) Int. Cl.
*G06K 7/016*   (2006.01)
*G06K 7/00*   (2006.01)
(Continued)

(52) U.S. Cl.
CPC ......... *G06K 7/0166* (2013.01); *G06K 7/0008* (2013.01)

(58) Field of Classification Search
CPC ............. G06K 7/0166; G06K 19/0723; G06K 19/07749; G06K 7/0008; G06K 19/07775;
(Continued)

(56) References Cited

U.S. PATENT DOCUMENTS 6,595,414 B1 *   7/2003   Eber .................. G06K 19/0723
235/487
8,872,385 B2   10/2014   Kinoshita et al.
(Continued)

FOREIGN PATENT DOCUMENTS

CN         1912900 A     2/2007
CN       100428273 C    10/2008
(Continued)

OTHER PUBLICATIONS

Munoz, "Triggerless charge measurement system for fast characterization with avalanche photodiodes and photomultipliers" (Year: 2020).*
The Importance of Data Synchronization in Multiboard Acquisition Systems (Year: 2020).*

*Primary Examiner* — Thien T Mai
(74) *Attorney, Agent, or Firm* — Sughrue Mion, PLLC

(57) ABSTRACT

The present disclosure provides systems and devices including reception circuits for communications between smart cards and card readers. In some embodiments, a reception circuit of a smart card includes a first circuit and a second circuit. The first circuit is configured to receive a wireless signal including a pause, and restore the wireless signal to a clock signal. The second circuit is configured to charge a voltage of a first node based on a first logic level of the clock signal, compare the voltage of the first node with a predefined reference voltage, and output, based on the comparison of the voltage of the first node, a synchronization signal indicating a rising starting time point of the pause of the wireless signal.

19 Claims, 20 Drawing Sheets

(51) Int. Cl.
*G06K 19/07* (2006.01)
*G06K 19/077* (2006.01)

(58) Field of Classification Search
CPC ............... G06K 19/07; G06K 7/10039; G06K 19/07779; G06K 19/07713; G06K 7/10316; G06K 17/0029; G06K 19/145; G06K 7/10297; G06K 7/10287; H04W 52/0293; H04W 52/0287; H04W 52/029; H04B 2215/065; H04B 2215/066
See application file for complete search history.

(56) References Cited

U.S. PATENT DOCUMENTS

| | | | |
|---|---|---|---|
| 8,933,733 | B2 | 1/2015 | Choke et al. |
| 10,740,575 | B1 | 8/2020 | Kim et al. |
| 2013/0321049 | A1* | 12/2013 | Lee .................. H03L 7/145 |
| | | | 327/156 |
| 2014/0341327 | A1* | 11/2014 | Raggam .................. H04B 5/48 |
| | | | 375/376 |

FOREIGN PATENT DOCUMENTS

| | | | | |
|---|---|---|---|---|
| CN | 102968657 | A | | 3/2013 |
| CN | 103106379 | A | | 5/2013 |
| CN | 103714374 | A | | 4/2014 |
| EP | 2595221 | A1 | * | 5/2013 ............. C01G 53/50 |
| JP | H05233894 | A | * | 9/1993 ......... G06K 19/0723 |

* cited by examiner

Sequence X

Sequence Y

Sequence Z

FIG. 19

FDT starting point deviation = 7 Clock

| Field Strength \ Number of clocks | 1170 | 1171 | 1172 | 1173 | 1174 | 1175 | 1176 | 1177 | 1178 | 1179 | 1180 | 1181 | 1182 | 1183 |
|---|---|---|---|---|---|---|---|---|---|---|---|---|---|---|
| 20 | 0 | 0 | 0 | 0 | 0 | 8 | 5 | 7 | 7 | 1 | 0 | 0 | 0 | 0 |
| 25 | 0 | 0 | 0 | 0 | 1 | 2 | 8 | 8 | 9 | 0 | 0 | 0 | 0 | 0 |
| 30 | 0 | 0 | 0 | 0 | 0 | 6 | 8 | 7 | 7 | 0 | 0 | 0 | 0 | 0 |
| 35 | 0 | 0 | 0 | 0 | 1 | 6 | 8 | 5 | 6 | 0 | 0 | 0 | 0 | 0 |
| 40 | 0 | 0 | 0 | 2 | 6 | 11 | 7 | 2 | 0 | 0 | 0 | 0 | 0 | 0 |
| 45 | 0 | 0 | 0 | 4 | 5 | 8 | 5 | 6 | 0 | 0 | 0 | 0 | 0 | 0 |
| 50 | 0 | 0 | 0 | 1 | 1 | 8 | 9 | 7 | 2 | 0 | 0 | 0 | 0 | 0 |
| 55 | 0 | 0 | 0 | 7 | 5 | 6 | 9 | 1 | 0 | 0 | 0 | 0 | 0 | 0 |
| 60 | 0 | 0 | 0 | 5 | 10 | 9 | 4 | 0 | 0 | 0 | 0 | 0 | 0 | 0 |
| 65 | 0 | 0 | 1 | 37 | 39 | 8 | 3 | 0 | 0 | 0 | 0 | 0 | 0 | 0 |
| 70 | 0 | 0 | 3 | 6 | 10 | 8 | 1 | 0 | 0 | 0 | 0 | 0 | 0 | 0 |
| 75 | 0 | 0 | 3 | 4 | 9 | 10 | 2 | 0 | 0 | 0 | 0 | 0 | 0 | 0 |
| 80 | 0 | 0 | 4 | 5 | 11 | 7 | 1 | 0 | 0 | 0 | 0 | 0 | 0 | 0 |
| 85 | 0 | 0 | 6 | 8 | 10 | 4 | 0 | 0 | 0 | 0 | 0 | 0 | 0 | 0 |
| 90 | 0 | 0 | 7 | 7 | 11 | 3 | 0 | 0 | 0 | 0 | 0 | 0 | 0 | 0 |
| 95 | 0 | 0 | 9 | 8 | 7 | 4 | 0 | 0 | 0 | 0 | 0 | 0 | 0 | 0 |
| 100 | 0 | 0 | 9 | 7 | 5 | 6 | 1 | 0 | 0 | 0 | 0 | 0 | 0 | 0 |

RECEPTION CIRCUIT AND SMART CARD INCLUDING THE SAME

CROSS-REFERENCE TO RELATED APPLICATIONS

This application claims benefit of priority under 35 U.S.C. § 119 to Korean Patent Application No. 10-2023-0041568, filed on Mar. 29, 2023, in the Korean Intellectual Property Office, the disclosure of which is incorporated by reference herein in its entirety.

BACKGROUND

1. Field

The present disclosure relates generally wireless communications, and more particularly, to a reception circuit and a smart card including the same.

2. Description of Related Art

Typically, smart card communications may conform to a communication protocol such as, but not limited to, a protocol specified by the International Organization for Standardization/International Electrotechnical Commission (ISO/IEC) 14443 standard. For example, a transmission signal transmitted by a card reader to the smart card may conform to parameters that may be defined by the communication protocol, such as, but not limited to, a rising time, a falling time, a modulation index (MI) of a pause, and the like. Alternatively or additionally, the communication protocol may define other parameters such as, but not limited to, a frame delay time (FDT) between a transmission signal transmitted from the card reader to the smart card and a reception signal received from the smart card by the card reader.

However, communication of the smart card may cause deviation in characteristics of the card reader and/or the smart card. Alternatively or additionally, the communication of the smart card may cause deviation in communication waveforms depending on a communication environment. For example, when the deviations cause the communications to no longer conform with the communication protocols, short-range wireless communication between the card reader and the smart card may be difficult to achieve and/or communication efficiency may be lowered. Thus, there exists a need for further improvements in short-range wireless communications between card readers and smart cards, as the need for efficient communications may be constrained by deviations in characteristics of the card readers and/or the smart cards that may cause the communications to no longer conform with communication protocols.

SUMMARY

Aspects of the present disclosure provide for a reception circuit that may improve communication efficiency between a smart card and a card reader, and a smart card including the same.

According to an aspect of the present disclosure, a reception circuit of a smart card is provided. The reception circuit includes a first circuit and a second circuit. The first circuit is configured to receive a wireless signal including a pause, and restore the wireless signal to a clock signal. The second circuit is configured to charge a voltage of a first node based on a first logic level of the clock signal, compare the voltage of the first node with a predefined reference voltage, and output, based on the comparison of the voltage of the first node, a synchronization signal indicating a rising starting time point of the pause of the wireless signal.

According to an aspect of the present disclosure, a smart card is provided. The smart card includes an antenna and a smart card chip. The antenna is configured to transmit a first wireless signal and receive a second wireless signal. The smart card chip is configured to receive, from the antenna, the second wireless signal including a pause, output a clock signal based on the second wireless signal, generate a node voltage based on a logic level of the clock signal, compare the node voltage with a reference voltage, output a synchronization signal that is activated based on whether the node voltage is greater than the reference voltage, and demodulate the synchronization signal to generate a demodulation signal.

According to an aspect of the present disclosure, a smart card system is provided. The smart card system includes a reader configured to transmit a wireless signal including a pause, and a smart card. The smart card is configured to receive the wireless signal, restore the wireless signal to a clock signal, and output a synchronization signal indicating a rising starting time point of the pause based on the clock signal maintaining a first logic level during a predetermined period of time and transitions to a second logic level different from the first logic level.

Additional aspects may be set forth in part in the description which follows and, in part, may be apparent from the description, and/or may be learned by practice of the presented embodiments.

BRIEF DESCRIPTION OF DRAWINGS

The above and other aspects, features, and advantages of certain embodiments of the present disclosure may be more apparent from the following description taken in conjunction with the accompanying drawings, in which:

FIG. 19 illustrates data obtained by measuring a deviation of a starting point of a FDT detected in a reception circuit of a related smart card, according to an embodiment;

DETAILED DESCRIPTION

Figure 1:
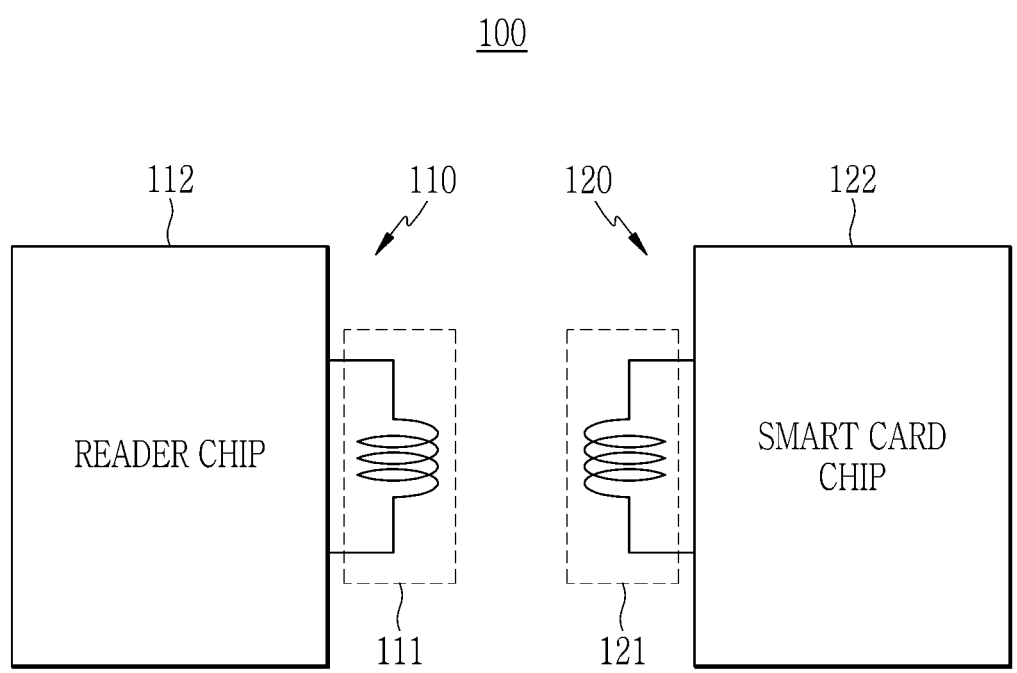
FIG. 1 illustrates a block diagram of a smart card system, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Hereinafter, various embodiments of the present disclosure are described with reference to the accompanying drawings.

As used herein, a smart card may be and/or may include a wireless and/or contactless integrated circuit (IC) card from among various IC card types. Alternatively or additionally, the smart card may operate (e.g., perform communications) according to one or more communication protocols and/or standards, such as, but not limited to, an International Organization for Standardization/International Electrotechnical Commission (ISO/IEC) 14443 standard. For example, the communication protocol may define parameters for communicating with contactless IC cards (e.g., proximity type IC cards) that may include, but not be limited to, parameters related physical characteristics, wireless frequency power, signal connection, initialization, collision prevention, and the like. As another example, according to ISO/IEC 14443, a contactless IC card may include an IC for performing processing and/or performing memory functions.

In an embodiment, the contactless IC card may not use a galvanic element, and may exchange signals and/or receive power by a proximity coupling device. That is, the contactless IC card may exchange signals and/or receive power by using inductive coupling with a card reader.

FIG. 1 illustrates a block diagram of a smart card system, according to an embodiment.

Referring to FIG. 1, a smart card system 100 may include a card reader 110 and a smart card 120.

The card reader 110 may be and/or may include a device that communicates with the smart card 120. In an embodiment, the card reader 110 may generate energy in a radio frequency (RF) field and transmit power to the smart card 120. For example, the RF signal may have a carrier frequency $f_c$ that may be approximately 13.56 megahertz (MHz)±7 kilohertz (kHz).

As shown in FIG. 1, the card reader 110 may include an antenna 111 and a reader chip 112. The card reader 110 may transmit a wireless signal to the smart card 120 through the antenna 111. Alternatively or additionally, the reader chip 112 may process data received from the smart card 120 through the antenna 111.

In an embodiment, the smart card 120 may communicate with the card reader 110 in a contactless manner to receive a signal from the card reader 110 to generate power. In such an embodiment, the smart card 120 may perform an operation according to a control instruction indicated by a signal provided from the card reader 110. Alternatively or additionally, the smart card 120 may generate data according to a result of the performing of the operation and may transmit the data to the card reader 110.

In an embodiment, the smart card 120 may include an antenna 121 and a smart card chip 122.

The antenna 121 may receive a wireless signal transmitted from the card reader 110. Alternatively or additionally, the antenna 121 may transmit a wireless signal to the card reader 110. For example, the smart card 120 and the card reader 110 may exchange signals in the form of electromagnetic waves through the antenna 111 of the card reader 110 and the antenna 121 of the smart card 120.

In an embodiment, the smart card chip 122 may receive an RF signal including a plurality of pauses from the card reader 110. In such an embodiment, the smart card chip 122 may detect a time point when the plurality of pauses of the received RF signal ends.

In an embodiment, the smart card chip 122 may generate, based on the RF signal, a clock signal having a frequency substantially similar as and/or equal to the carrier frequency $f_c$ of the RF signal. Alternatively or additionally, the smart card chip 122 may detect the time point at which the pause of the RF signal ends based on the clock signal.

Figure 2:
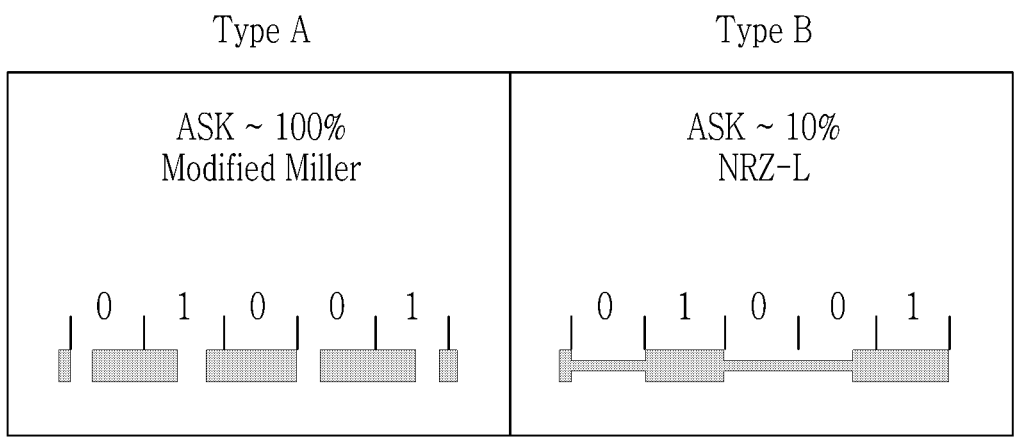
FIGS. 2 and 3 illustrate examples of communication signals for a type A interface and a type B interface of the International Organization for Standardization/International Electrotechnical Commission (ISO/IEC) 14443 standard, according to an embodiment.
Figure 3:
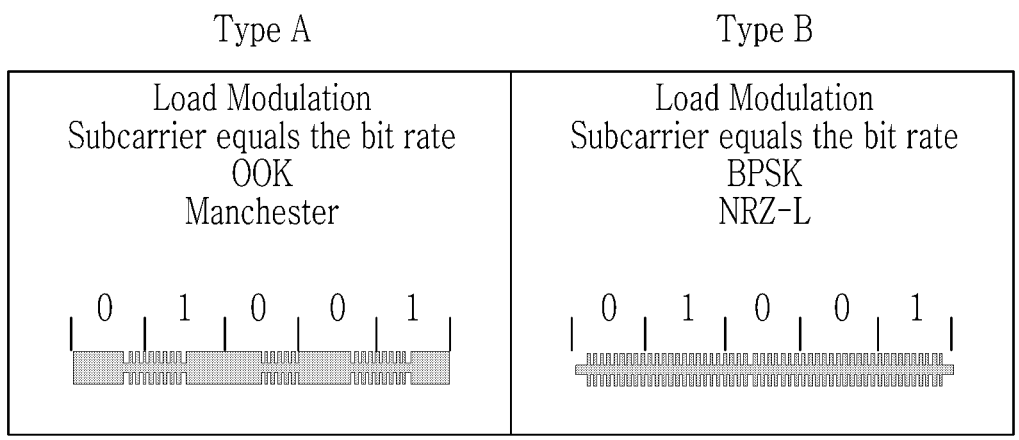

FIGS. 2 and 3 illustrate examples of communication signals for a type A interface and a type B interface of the ISO/IEC 14443 standard, according to an embodiment.

The signals shown in FIG. 2 may be and/or may include a signal transmitted from the card reader 110 to the smart card 120. The signals shown in FIG. 3 may be and/or may include a signal transmitted from the smart card 120 to the card reader 110.

Referring to FIGS. 2 and 3, the ISO/IEC 14443 standard may describe two types of communication signal connections (e.g., type A and type B). For example, communication from the card reader 110 to the smart card 120, according to the ISO/IEC 14443 type A interface, may use an amplitude shift keying (ASK) 100% modulation method and a modified miller code method in an RF operating range. In an embodiment, a bit rate of the signal transmitted from the card reader 110 to the smart card 120 using the type A interface may be calculated by dividing the carrier frequency $f_c$ of the RF signal by 128 (e.g., $f_c/128$). For example, when the carrier frequency $f_c$ of the RF signal is approximately 13.56 MHZ, the bit rate may be approximately 106 kilobits per second (kbps) (e.g., 13.56 MHZ/199=106 kbps). As another example, the signal transmitted from the smart card 120 to the card reader 110 may be coded in the Manchester code method that may be modulated in an on-off key (OOK) method. Related smart cards, which may use the type A communication signal connection method and which may be operated in environments such as subways and/or buses, may transmit and/or receive data in a bit-by-bit manner by generating timing at a certain time interval from the ASK modulation signal received from the card reader 110.

Continuing to refer to FIGS. 2 and 3, in an embodiment, communication from the card reader 110 to the smart card 120, according to the ISO/IEC 14443 type B interface, may use an ASK 10% modulation method and a non-return-to-zero-level (NRZ-L) encoding. In an optional or additional embodiment, communication from the smart card 120 to the card reader 110 may use binary phase-shift keying (BPSK) modulation with NRZ-L encoding.

Figure 4:
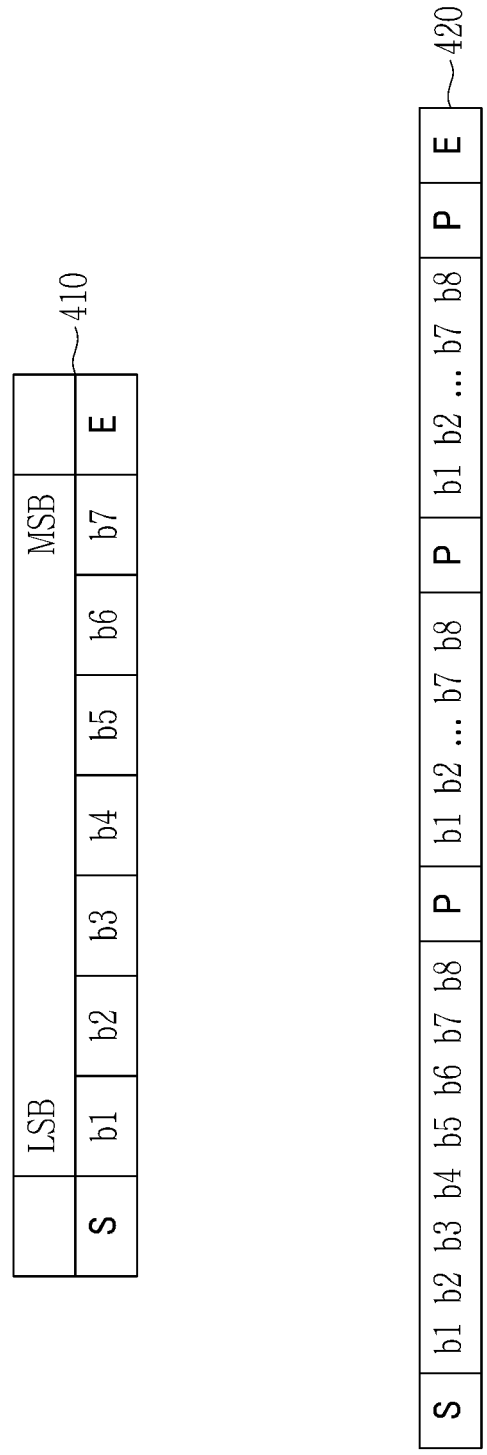
FIG. 4 illustrates a data frame format for a type A interface of the ISO/IEC 14443 standard, according to an embodiment.
Figure 5:
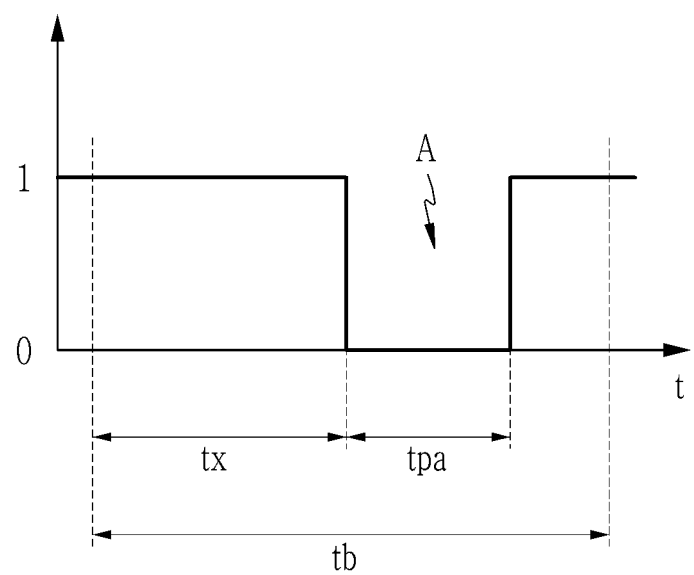
FIGS. 5 to 7 are drawings depicting a bit expression method of a communication signal for a type A interface of the ISO/IEC 14443 standard, according to an embodiment.
Figure 6:
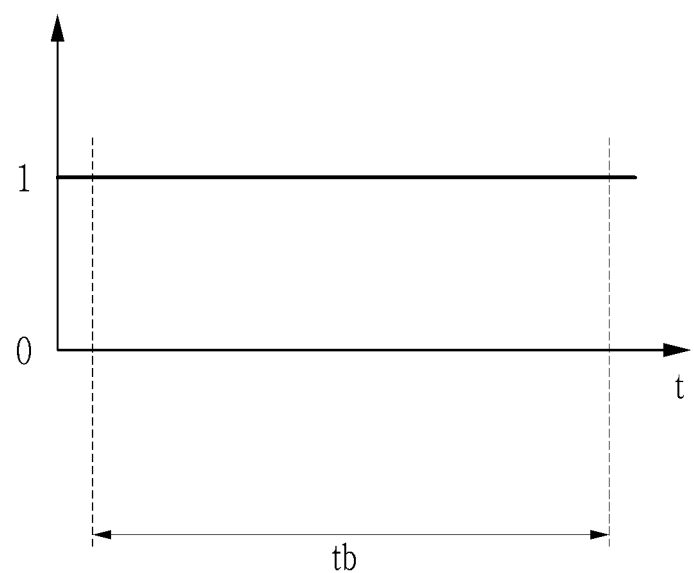
Figure 7:
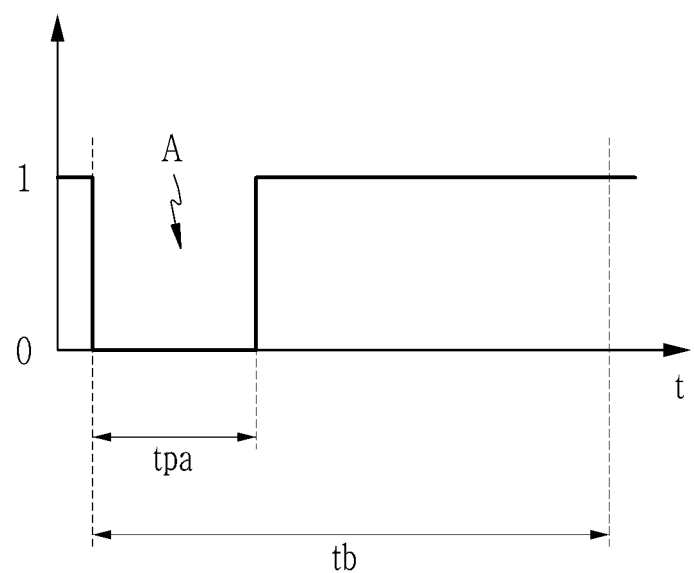

FIG. 4 illustrates a data frame format for a type A interface of the ISO/IEC 14443 standard, according to an embodiment. FIGS. 5 to 7 are drawings depicting a bit expression method of a communication signal for a type A interface of the ISO/IEC 14443 standard, according to an embodiment.

Referring to FIG. 4, a short frame 410 may include a start bit S, data bits (e.g., first data bit b1, second data bit b2, third data bit b3, fourth data bit b4, fifth data bit b5, sixth data bit b6, and seventh data bit b7), and an end bit E. As shown in FIG. 4, a standard frame 420 may be configured to include a start bit S, a combination of data bits b1 to b8 and a parity bit P, and an end bit E. The data bits of FIG. 4 may be represented by the bit expression method of FIGS. 5 to 7.

Referring to FIG. 5, sequence X illustrates a bit having a total bit duration tb. As shown in FIG. 5, the bit of sequence X has a high logic level "1" during a time duration tx, followed by a pause A during a time duration tpa in which the bit has a low logic level "0", and further followed by returning to the high logic level "1" after time duration tpa has elapsed. In an embodiment, the tx duration may be substantially similar as and/or equal to half of the total bit duration tb (e.g., tx=½ xtb).

Referring to FIG. 6, sequence Y illustrates a bit in which modulation (e.g., a change in logic levels) does not occur during the total bit duration tb.

Referring to FIG. 7, sequence Z illustrates a bit having a pause A that occurs at the beginning of the bit duration tb. As shown in FIG. 7, the pause A may have a time duration tpa, which may be smaller than total bit duration tb (e.g., tpa<tb).

In an embodiment, the sequence Y may represent a logic "0". Alternatively or additionally, when two or more consecutive logic "0" are adjacent to each other, the sequence Z may be used to represent the second consecutive logic "0". In an optional or additional embodiment, when the first bit after the start bit S is logic "0", the sequence Z may be used to represent logic "0" in the first bit and logic "0" in the next bit.

Figure 8:
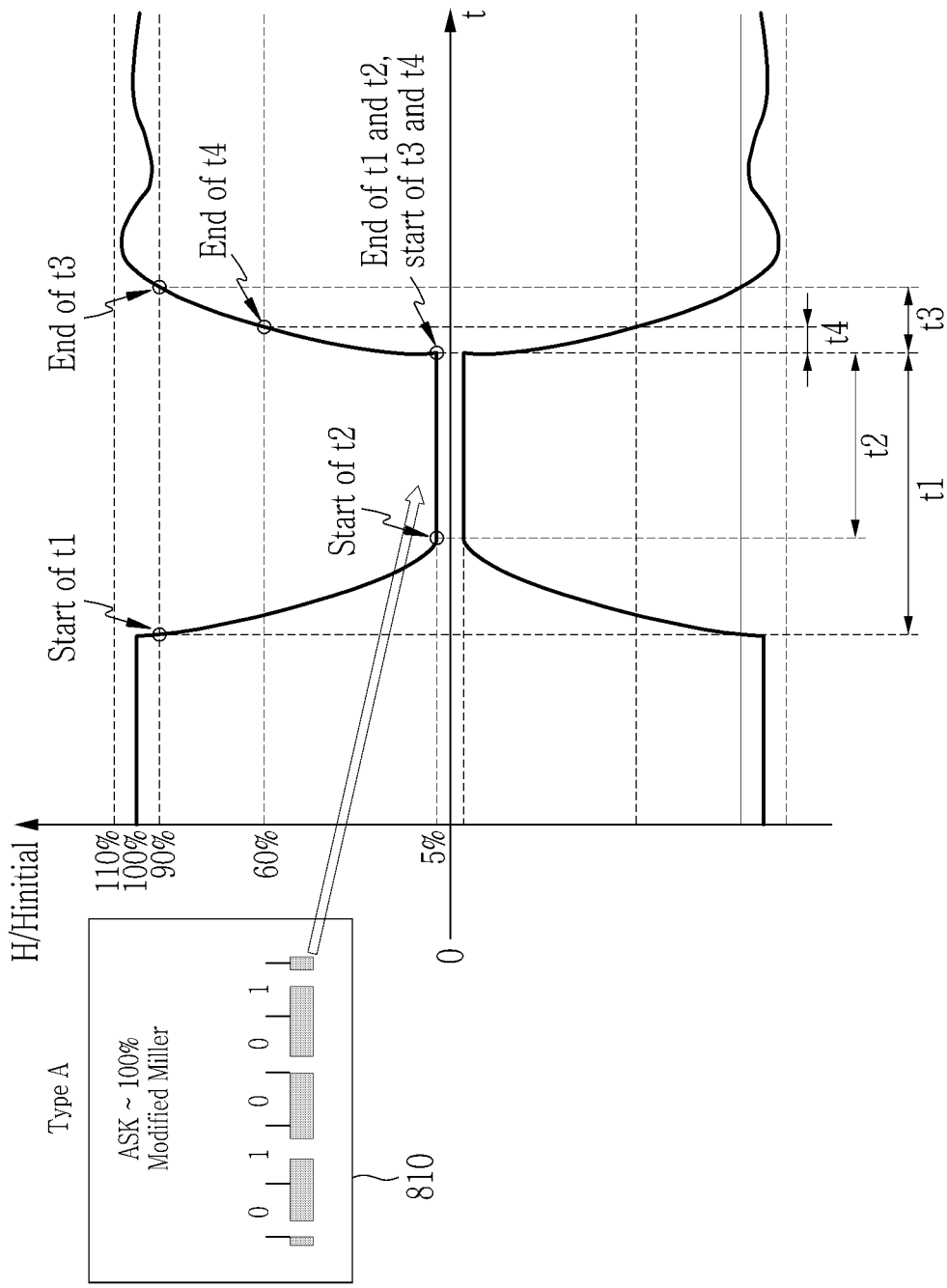
FIG. 8 illustrates a waveform of a pause of a type A interface of the ISO/IEC 14443 standard, according to an embodiment.

FIG. 8 illustrates a waveform of a pause A of a data frame of a type A interface of the ISO/IEC 14443 standard, according to an embodiment.

Referring to FIG. 8, a bit expression of a communication signal 810, of the type A interface of the ISO/IEC 14443 standard, may include a logic sequence of "0", "1", "0", "0", and "1". Alternatively or additionally, the communication signal 810 may include a plurality of pauses.

Continuing to refer to FIG. 8, the horizontal axis may represent a time t axis, and the vertical axis may represent a field signal from the card reader 110 (e.g., $H/H_{initial}$, where H may represent an equivalent homogenous magnetic field strength, and $H_{initial}$ may represent the strength of the unmodulated RF field).

As shown in FIG. 8, time duration t1 may represent a time duration of the pause A, time duration t2 may represent a low time of the pause A, time duration t3 may represent a rising time of the pause A, and time duration t4 may represent a portion of the rising time of the pause A. In an embodiment, the communication signal 810, of the type A interface of the ISO/IEC 14443 standard, transmitted from the card reader 110 to the smart card 120 may satisfy the conditions defined in Table 1, according to the ISO/IEC 14443 standard.

TABLE 1

| Pause Conditions | | | |
|---|---|---|---|
| Parameter | Condition | Min | Max |
| t1 | | $27.5/f_c$ | $41/f_c$ |
| t2 | $t1 > 34/f_c$ | $6/f_c$ | t1 |
|  | $t2 \leq 34/f_c$ | $9/f_c$ | |
| t3 | | $1.5 \times t4$ | $17/f_c$ |
| t4 | | 0 | $7/f_c$ |

In an embodiment, the smart card 120 may include a decoding circuit configured to extract respective bits from a radio signal received from the card reader 110. The decoding circuit may separate the extracted bits into the start bit S, the data bits b1 to b7, and the end bit E. The decoding circuit may detect received data from the separated bit information. For example, during one frame, transmission from the smart card 120 to the card reader 110 may be performed after the FDT has elapsed from the starting point of the rising of the last pause. The FDT may be specified by the ISO/IEC 14443 standard specifies according to the command type and the logic state of the last transmitted data bit. However, it may be difficult to implement the FDT according to the ISO/IEC 14443 standard by accurately detecting an end point of a pause from a radio signal including a discontinuous period (e.g., a pause).

Figure 9:
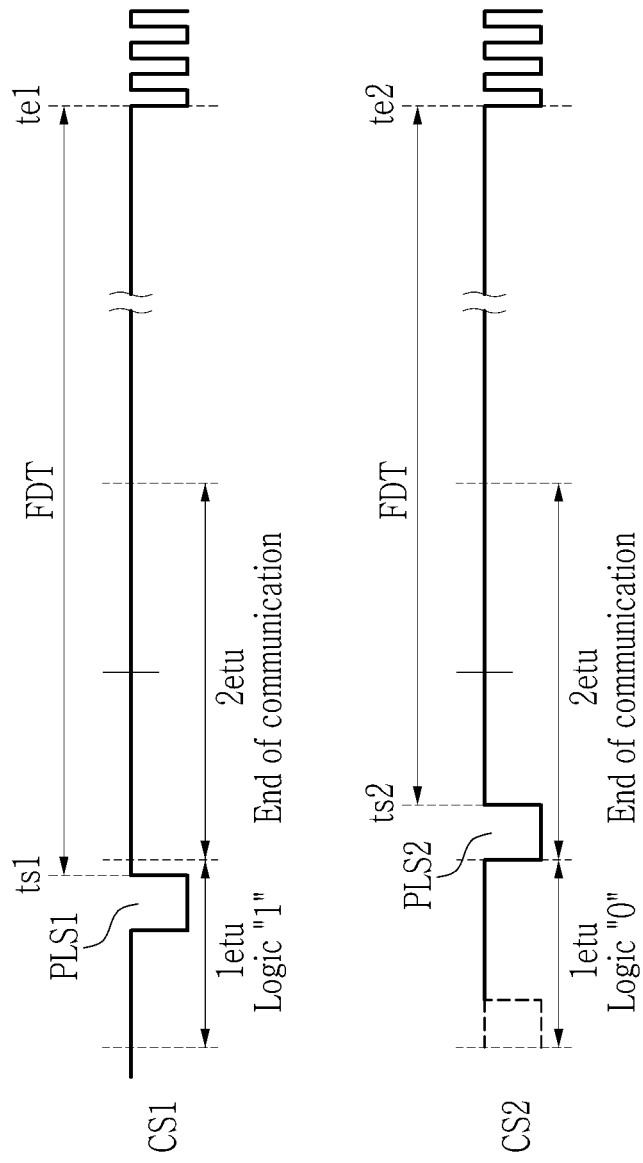
FIG. 9 is a drawing depicting a frame delay time (FDT), according to an embodiment.

FIG. 9 is a drawing depicting the FDT, according to an embodiment.

Referring to FIG. 9, the FDT may correspond to the time between the end point of the last pause (e.g., PLS1, PLS2) of the frame transmitted from the card reader 110. That is, the FDT may correspond to the time from the rising start point (e.g., ts1, ts2) and the first modulation edge of the start bit transmitted by the smart card 120, which may correspond to the start time (e.g., te1, te2) of the modulation signal. As shown in FIG. 9, etu may represent an elementary time unit corresponding to one data bit. The first case CS1 may illustrate that, when the last bit transmitted by the card reader 110 in FIG. 1 is a logic "1" (e.g., the sequence X of FIG. 5), the end of the communication may be indicated when the two unit times (2etsu) following the logic "1" correspond to the sequence Y of FIG. 6. The second case CS2 may illustrate that, when the last bit transmitted by the card reader 110 is logic "0" (e.g., the sequence X of FIG. 5 or the sequence Z of FIG. 7), the end of communication may be indicated when the two unit times (2etsu) following the logic "O" correspond to the sequence Z of FIG. 7 and the sequence Y of FIG. 6, in sequence.

For one frame transmitted from the card reader 110 to the smart card 120, in order for transmission from the smart card 120 to the card reader 110 to be performed after the FDT that may be specified in the ISO/IEC 14443 standard has elapsed from the start of the rising of the last pause, it may be needed to accurately detect the starting point of the rising edge of the last pause of the frame. That is, it may be important to accurately detect the starting point of the FDT.

Figure 10:
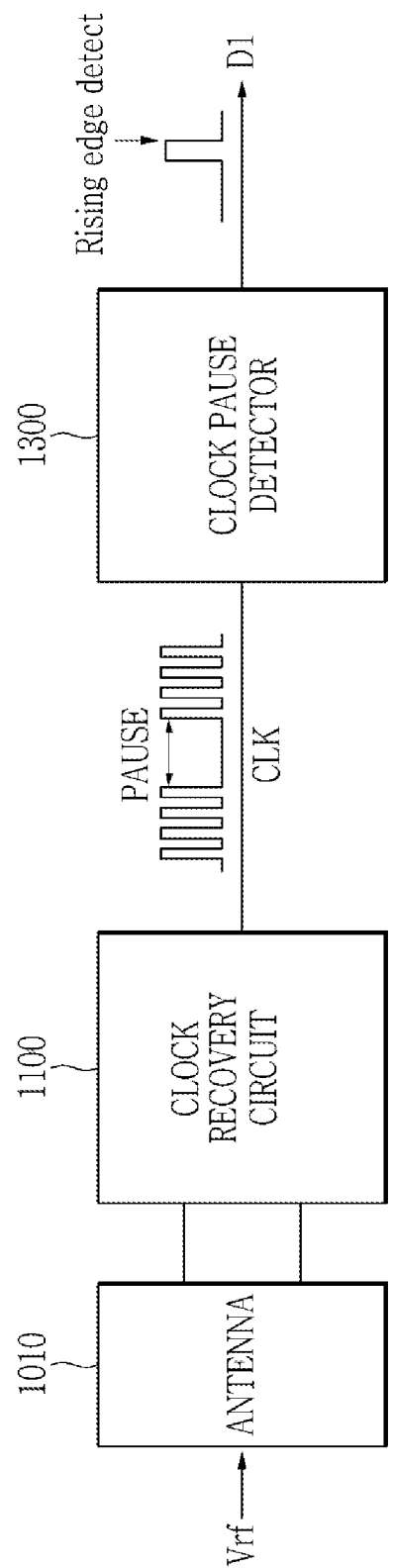
FIG. 10 illustrates a block diagram of a reception circuit of a smart card, according to an embodiment.

FIG. 10 illustrates a block diagram of a reception circuit of a smart card, according to an embodiment.

Referring to FIG. 10, a reception circuit 1000 of the smart card 120 may include an antenna 1010, a clock recovery circuit 1100, and a clock pause detector 1300.

The antenna 1010 may receive an ASK RF signal Vrf. The antenna 1010 may transmit the ASK RF signal Vrf to the clock recovery circuit 1100. In an embodiment, the ASK RF signal Vrf may include a pause. In an optional or additional embodiment, the ASK RF signal Vrf may include a plurality of pauses. Alternatively or additionally, the ASK RF signal Vrf may be and/or include an ISO/IEC 14443 type A communication signal. That is, the ASK RF signal Vrf may conform to the ISO/IEC 14443 standard.

The clock recovery circuit 1100 may rectify the ASK RF signal Vrf received from the antenna 1010. In an embodiment, the clock recovery circuit 1100 may generate a clock signal CLK having a substantially similar and/or the same frequency as the carrier frequency $f_c$ of the ASK RF signal Vrf. An example operation of the clock recovery circuit 1100 is described with reference to FIGS. 11 and 12.

The clock pause detector 1300 may output a synchronization signal D1 for detecting the starting point of the FDT of the ASK RF signal Vrf based on a logic level of the clock signal CLK generated by the clock recovery circuit 1100. An example operation of the clock pause detector 1300 is described with reference to FIGS. 13 to 15.

Figure 11:
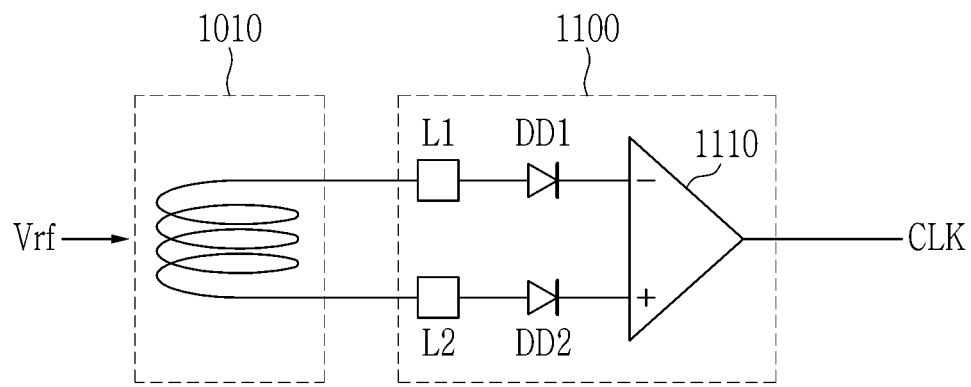
FIG. 11 illustrates a clock recovery circuit, according to an embodiment.
Figure 12:
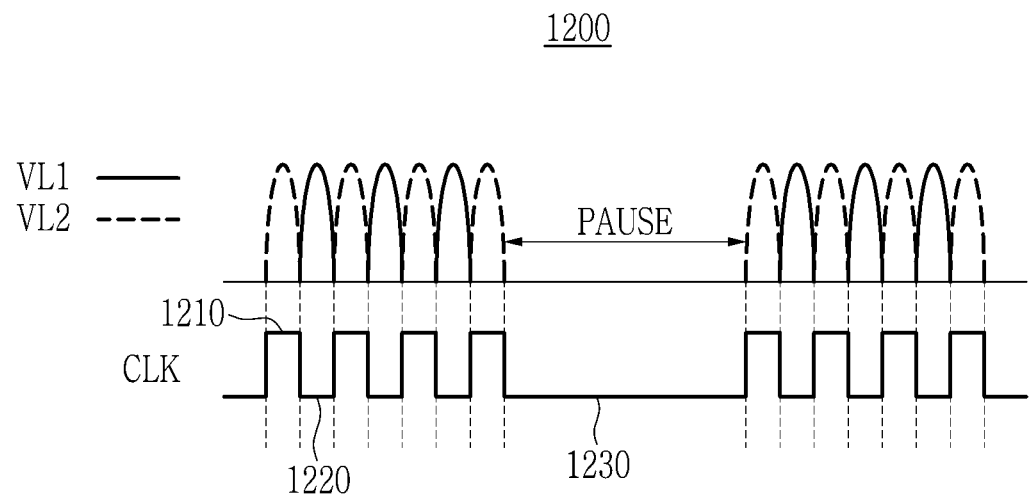
FIG. 12 illustrates a timing diagram of an operation method of a clock recovery circuit, according to an embodiment.

FIG. 11 illustrates the clock recovery circuit 1100 included in the reception circuit of FIG. 10, according to an embodiment. FIG. 12 illustrates a timing diagram of an operation method of the clock recovery circuit of FIG. 11, according to an embodiment.

Referring to FIG. 11, the clock recovery circuit 1100 may include rectifier circuits (e.g., first rectifier circuit DD1 and second rectifier circuit DD2) and a first comparator 1110 that may rectify the output of the antenna 1010 provided through input terminals (e.g., first input terminal L1 and second input terminal L2). The antenna 1010 may receive the ASK RF signal Vrf transmitted from the card reader 110, and the first and second rectifier circuits DD1 and DD2 may be connected to the first and second input terminals L1 and L2, respectively, to rectify the voltage and current induced by the antenna 1010. The output terminals of the first and second rectifier circuits DD1 and DD2 may be connected to the first comparator 1110. As used herein, signals of the output terminals of the rectifier circuits DD1 and DD2 may be referred to as rectified signals (e.g., first rectified signal VL1 and second rectified signal VL2). The comparator 1110 may output a clock signal CLK by comparing the first and second rectified signals VL1 and VL2. An example operation method of the comparator 1110 is described with reference to FIG. 12.

Referring to FIG. 12, the first and second rectified signals VL1 and VL2 outputted from the first and second rectifier circuits DD1 and DD2 may be unipolar signals. Alternatively or additionally, the first and second rectified signals VL1 and VL2 may have a phase difference of 180 degrees. When the ASK RF signal Vrf inputted to the smart card 120 includes the plurality of pauses, the first and second rectified signals VL1 and VL2 may also include a pause PAUSE.

The first comparator 1110 may output the clock signal CLK by comparing the first and second rectified signals VL1 and VL2. For example, the first comparator 1110 may compare the first and second rectified signals VL1 and VL2 with each other. Alternatively or additionally, the first comparator 1110 may generate a clock signal CLK that may be activated (e.g., have an active level) in a period in which a second level of the second rectified signal VL2 may be greater than a first level of the rectified signal VL1. For example, when the second rectified signal VL2 is greater than the first rectified signal VL1, the clock signal CLK may become a logic high level 1210. Alternatively or additionally, when a first level of the first rectified signal VL1 is greater than a second level of the second rectified signal VL2, the clock signal CLK may become a logic low level 1220. In an embodiment, while the first and second rectified signals VL1 and VL2 output the pause PAUSE, the clock signal CLK may maintain a logic low level 1230. The clock signal CLK outputted from the first comparator 1110 may have a substantially similar or the same frequency as the carrier frequency $f_c$ of the ASK RF signal Vrf in the frame period except for the pause PAUSE. In an embodiment, the clock recovery circuit 1100 may restore the ASK RF signal Vrf, that may be an analog signal to the clock signal CLK that may be a digital signal.

Figure 13:
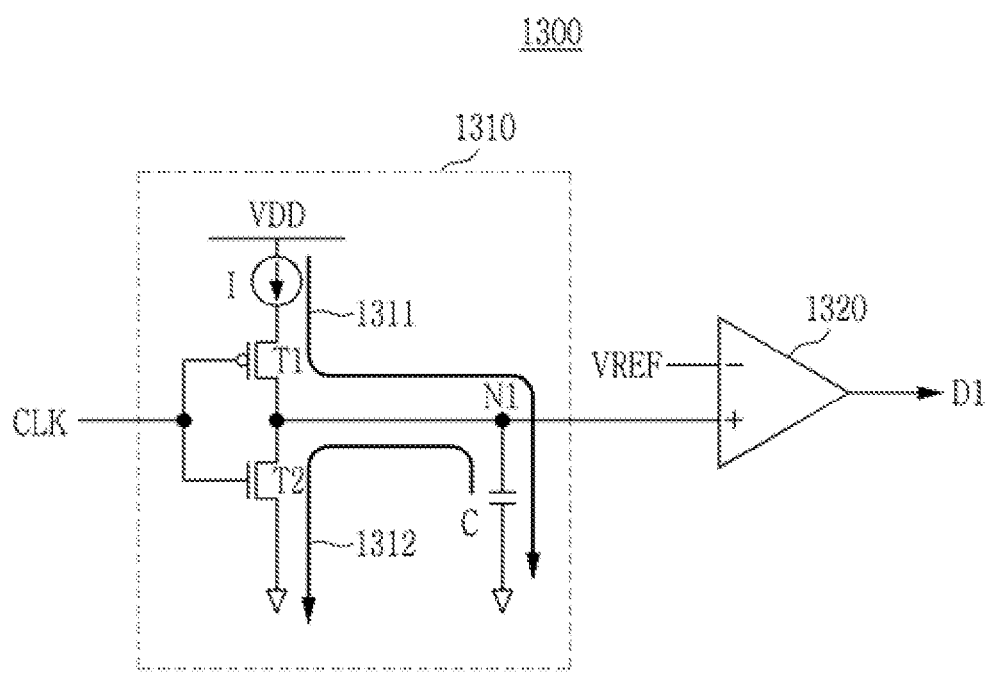
FIG. 13 illustrates a clock pause detector, according to an embodiment.
Figure 14:
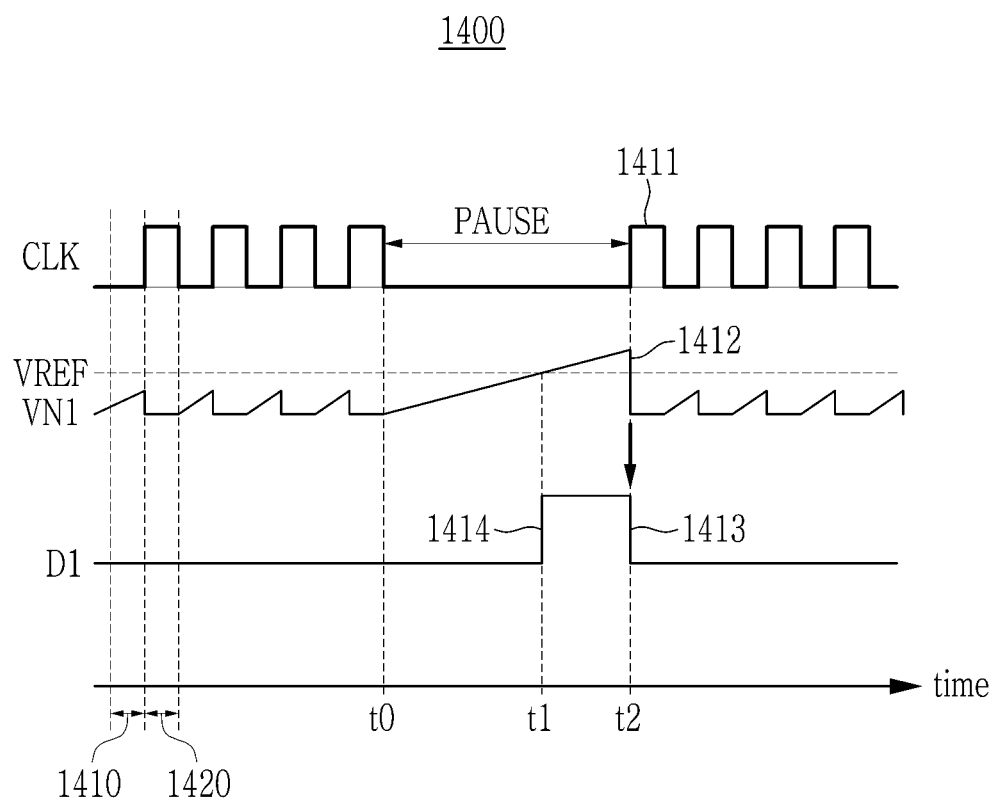
FIGS. 14 and 15 are drawings depicting an operation method of a clock pause detector, according to an embodiment.
Figure 15:
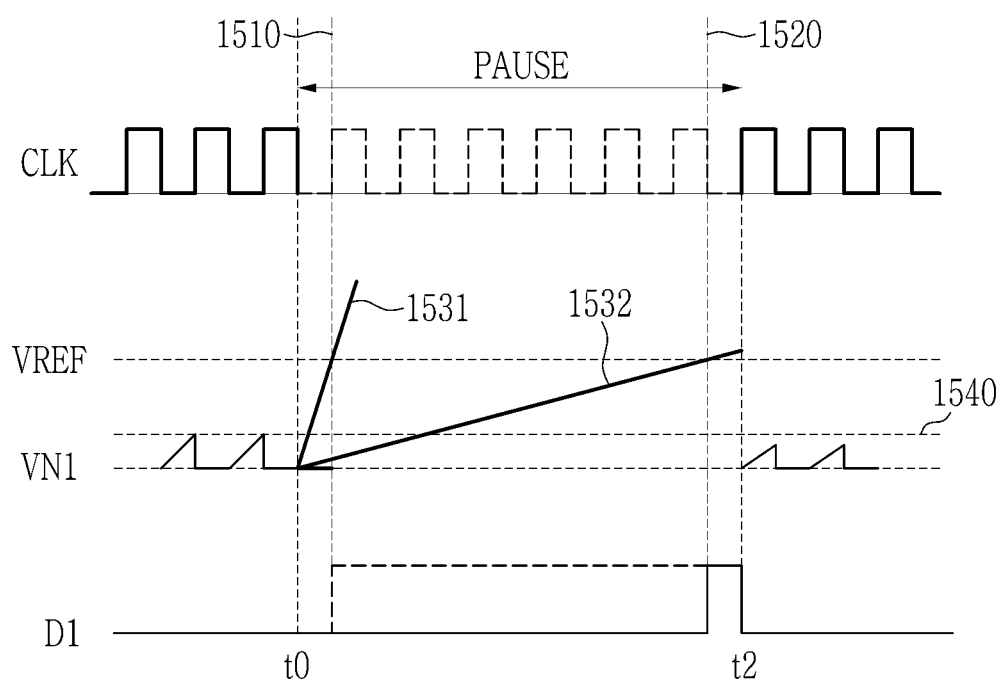

FIG. 13 illustrates a clock pause detector included in the reception circuit of FIG. 10, according to an embodiment. FIGS. 14 and 15 are drawings depicting an operation method of the clock pause detector of FIG. 13, according to an embodiment.

Referring to FIG. 13, the clock pause detector 1300 may receive the clock signal CLK from the clock recovery circuit 1110. In an embodiment, the clock pause delector may output the synchronization signal D1 indicating the starting point of the FDT based on the clock signal CLK. The clock pause detector 1300 may include a node voltage generator 1310 and a second comparator 1320 that compares a node voltage and a reference voltage VREF. An output terminal of the node voltage generator 1310 may be connected to a non-inverting input terminal (+) of the second comparator 1320.

In an embodiment, the node voltage generator 1310 may receive the clock signal CLK outputted from the clock recovery circuit 1100 as an input. Alternatively or additionally, the node voltage generator 1310 may charge an internal capacitor C according to the logic level of the clock signal CLK to generate a voltage of a node N1. The node voltage generator 1310 may include a first transistor T1, a second transistor T2, and the internal capacitor C. For example, in the node voltage generator 1310, the first transistor T1 may include one end electrically connected (e.g., coupled) to a voltage supply terminal VDD, the other end of the first transistor T1 may be electrically connected to the node N1, and a gate of the first transistor T1 may be configured to receive the clock signal CLK. As another example, in the node voltage generator 1310, the second transistor T2 may include one end electrically connected to the node N1, the other end of the second transistor T2 may be electrically connected to a reference voltage supply terminal VSS, and a gate may be configured to receive the clock signal CLK. A first electrode of the internal capacitor C may be connected to the node N1, and a second electrode of the internal capacitor C may be electrically connected to the reference voltage supply terminal VSS. Hereinafter, it may be assumed and described that the first transistor T1 is a P-type transistor and the second transistor T2 is an N-type transistor.

In the embodiment, the second comparator 1320 may receive a node voltage VN1 and the reference voltage VREF as inputs. Alternatively or additionally, the second comparator 1320 may compare the node voltage VN1 and the reference voltage VREF to output the synchronization signal D1. The node voltage VN1 may be inputted to a non-inverting input terminal (+) of the second comparator 1320, and the reference voltage VREF may be inputted to an inverting input terminal (−) thereof. However, the present disclosure is not limited in this regard. For example, the reference voltage VREF may be inputted to the non-inverting input terminal (+) and the node voltage VN1 may be inputted to the inverting input terminal (−).

An example operation method of the node voltage generator 1310 and the second comparator 1320 is described with reference to FIG. 14.

Referring to timing diagram 1400 of FIG. 14, the node voltage generator 1310 may charge and/or discharge the internal capacitor C according to the logic level of the clock signal CLK. For example, in a period 1410, when the clock signal CLK is at a logic low level, the first transistor T1 may be turned on, and a first current 1311 may flow from the voltage supply terminal to the internal capacitor C through the first transistor T1, so that the internal capacitor C may be charged. In this case, the voltage applied to node N1 by the charging of the internal capacitor C may be referred to as the node voltage VN1. In an embodiment, the node voltage VN1 may be charged at a constant rate of change. Alternatively or additionally, in a period 1420 when the clock signal CLK is at a logic high level, the second transistor T2 may be turned on, and a second current 1312 may flow to the reference voltage supply terminal through the second transistor T2 from the internal capacitor C, so that the internal capacitor C may be immediately discharged. Consequently, the node voltage VN1 may be reduced, as shown in FIG. 14.

In the node voltage generator 1310, during the period t0 to t2 in which the clock signal CLK may be maintained at the low level, the first current 1311 may flow from the voltage supply terminal to the internal capacitor C through the first transistor T1, so that the internal capacitor C may be charged. At the time point t2, when the clock signal CLK transitions to the logic high level 1411, the internal capacitor C may be immediately discharged. The time point t2, when the clock signal CLK transitions to the logic high level 1411, may be the rising starting point of the pause PAUSE of the ASK RF signal Vrf sent by the card reader 110 to the smart card 120. That is, the time point t2 may be the starting point of the FDT.

Continuing to refer to FIGS. 13 and 14, the second comparator 1320 may compare the node voltage VN1 and the reference voltage VREF, and may output the synchronization signal D1 based on the comparison result. For example, the second comparator 1320 may compare the node voltage VN1 and the reference voltage VREF, and may generate a synchronization signal D1 activated in a period (e.g., time point t1 to time point t2) in which the node voltage VN1 is greater than the reference voltage VREF. As another example, at the time point t1, when the node voltage VN1 is greater than the reference voltage VREF, the synchronization signal D1 may transition to the logic high level (e.g., transition 1414), and at the time point t2, when the node voltage VN1 is smaller than the reference voltage VREF, the synchronization signal D1 may transition to the logic low level (e.g., transition 1413). From the time point t2, when the synchronization signal D1 transitions to the logic low level (e.g., transition 1413), the rising starting point of the pause PAUSE of the ASK RF signal Vrf (e.g., the starting point of the FDT) may be detected.

FIG. 15 is a drawing depicting a rate of change of the node voltage VN1, according to an embodiment.

Referring to FIGS. 14 and 15, in order to detect the starting point of the FDT from the time point t2, when the synchronization signal D1 (e.g., the output signal of the second comparator 1320) transitions to the logic low level (e.g., transition 1413), the node voltage VN1 may need to exceed the reference voltage VREF during the pause PAUSE (e.g., from the time point t0 to the time point t2) of the clock signal CLK. According to the ISO/IEC 14443 standard, a minimum value of the range of the pause PAUSE of the ASK RF signal Vrf, corresponding to the time duration from time point t0 to time point t2, of the clock signal CLK may be defined as $6/f_c$, as shown Table 1. That is, the node voltage VN1 may need to exceed the reference voltage VREF before passing the time point 1520 at which the pause PAUSE (e.g., from time point t0 to time point t2) of the clock signal CLK may have a minimum time duration of $6/f_c$. For example, as shown in FIG. 15, a first slope 1532 may represent the minimum change rate of the node voltage VN1.

Alternatively or additionally, since the node voltage VN1 may increase and/or decrease according to the logic level of the clock signal CLK, the node voltage VN1 may need to not exceed the reference voltage VREF before passing the time point 1510 at which the pause PAUSE of the clock signal CLK may have a time duration of $1/2f_c$. As shown FIG. 15, a second slope 1531 may represent the maximum change rate of the node voltage VN1.

Continuing to refer to FIGS. 13 and 15, the change rate of the node voltage VN1 may be adjusted by changing the current I provided from the voltage supply terminal of the node voltage generator 1310 and the internal capacitor C based on the reference voltage VREF. A magnitude of the current I and a capacity of the internal capacitor C may satisfy Equation 1 below.

$$\frac{VREF \times f_c}{6} < \text{slope of node voltage } VN1 = \frac{\text{amount of current } I}{\text{capacity of } C} < 2 \times VREF \times f_c \qquad \text{Eq. 1}$$

Referring to Eq. 1, VREF represents the reference voltage, $f_c$ represents the carrier frequency of the ASK RF signal Vrf, and C represents the internal capacitor.

In an embodiment, the reference voltage VREF may be greater than the voltage level 1540, which may be voltage level to which the node voltage VN1 may increase during $\frac{1}{2} f_c$ of the clock signal CLK (e.g., time point 1510).

Figure 16:
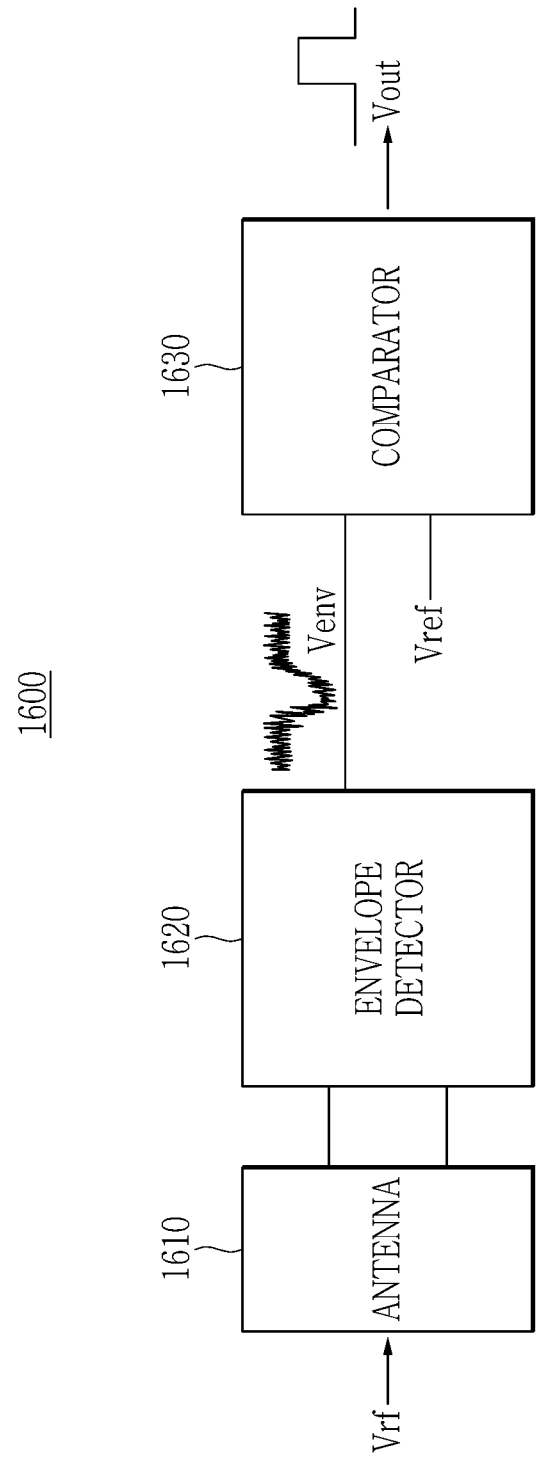
FIG. 16 is a drawing illustrating a reception circuit of a related smart card, according to an embodiment.
Figure 17:
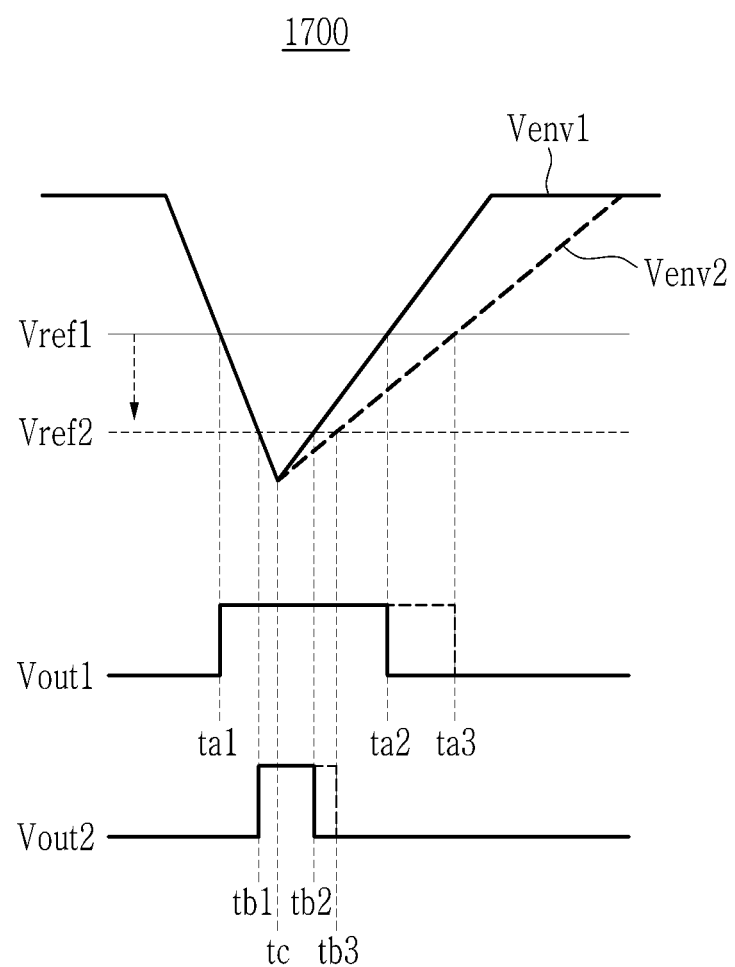
FIG. 17 is a drawing depicting a deviation of a FDT of a reception circuit of a related smart card, according to an embodiment.

FIG. 16 is a drawing illustrating a block diagram of a reception circuit of a related smart card, according to an embodiment. FIG. 17 is a drawing depicting a deviation of a FDT of a reception circuit of a related smart card, according to an embodiment.

Referring to FIG. 16, a reception circuit 1600 of a related smart card may include an antenna 1610, an envelope detector 1620, and a comparator 1630. The reception circuit 1600 of the related smart card may receive, through the antenna 1610, an ASK RF signal Vrf that may include a plurality of pauses, and may output an envelope voltage signal Venv from the envelope detector 1620, based on the received ASK RF signal Vrf. The comparator 1630 may compare the envelope voltage signal Venv and the reference voltage Vref and may output a comparison signal Vout that may detect (or indicate) a rising point of the envelope voltage signal Venv.

Referring to FIG. 17, drawing 1700 depicts an example of a deviation of a FDT of the reception circuit 1600 of a related smart card, according to an embodiment.

As shown in FIG. 17, depending on a communication environment and/or an operating condition of a related card reader and the related smart card, waveforms (e.g., first waveform Venv1 and second waveform Venv2) of a pause of a wireless signal transmitted from the related card reader to the related smart card may be changed. Alternatively or additionally, a rising time point of the detected envelope signal may be changed according to values of the first and second waveforms and reference voltages (e.g., a first reference voltage Vref1 and a second reference voltage Vref2) of the corresponding pauses of the first and second waveforms.

For example, as shown in FIG. 17, when the reference voltage Vref is the first reference voltage Vref1, a first comparison signal Vout1 between the first reference voltage signal Vref1 and the first envelope voltage signal Venv1 may be activated in the time period from first time point ta1 to second time point ta2. Alternatively or additionally, the first comparison signal Vout1 between the first reference voltage signal Vref1 and the second envelope voltage signal Venv2 may be activated in the time period from the first time point ta1 to a third time point ta3.

That is, when the reference voltage Vref1 is fixed without considering the communication environment and/or the operating condition, even if the start point tc of the FDT is the same, the starting point ta2 of the FDT detected based on the first envelope voltage signal Venv1 may be different from the starting point ta3 of the FDT detected based on the second envelope voltage signal Venv2 is different.

In an optional or additional embodiment, when the reference voltage Vref is the second reference voltage Vref2, a second comparison signal Vout2 between the second reference voltage signal Vref2 and the first envelope voltage signal Venv1 may be activated in the time period from a first time point tb1 and a second time point tb2. Alternatively or additionally, the second comparison signal Vout2 between the second reference voltage signal Vref2 and the second envelope voltage signal Venv2 may be activated in the time period from the first time point tb1 to a third time point tb3.

That is, even if the first envelope voltage signal Venv1 is the same, the starting points ta2 and tb2 of the FDT may change according to the first or second reference voltage Vref1 or Vref2. Therefore, a separate process for finding a suitable reference voltage may be needed that may consider the communication environment and/or the operating condition.

Figure 18:
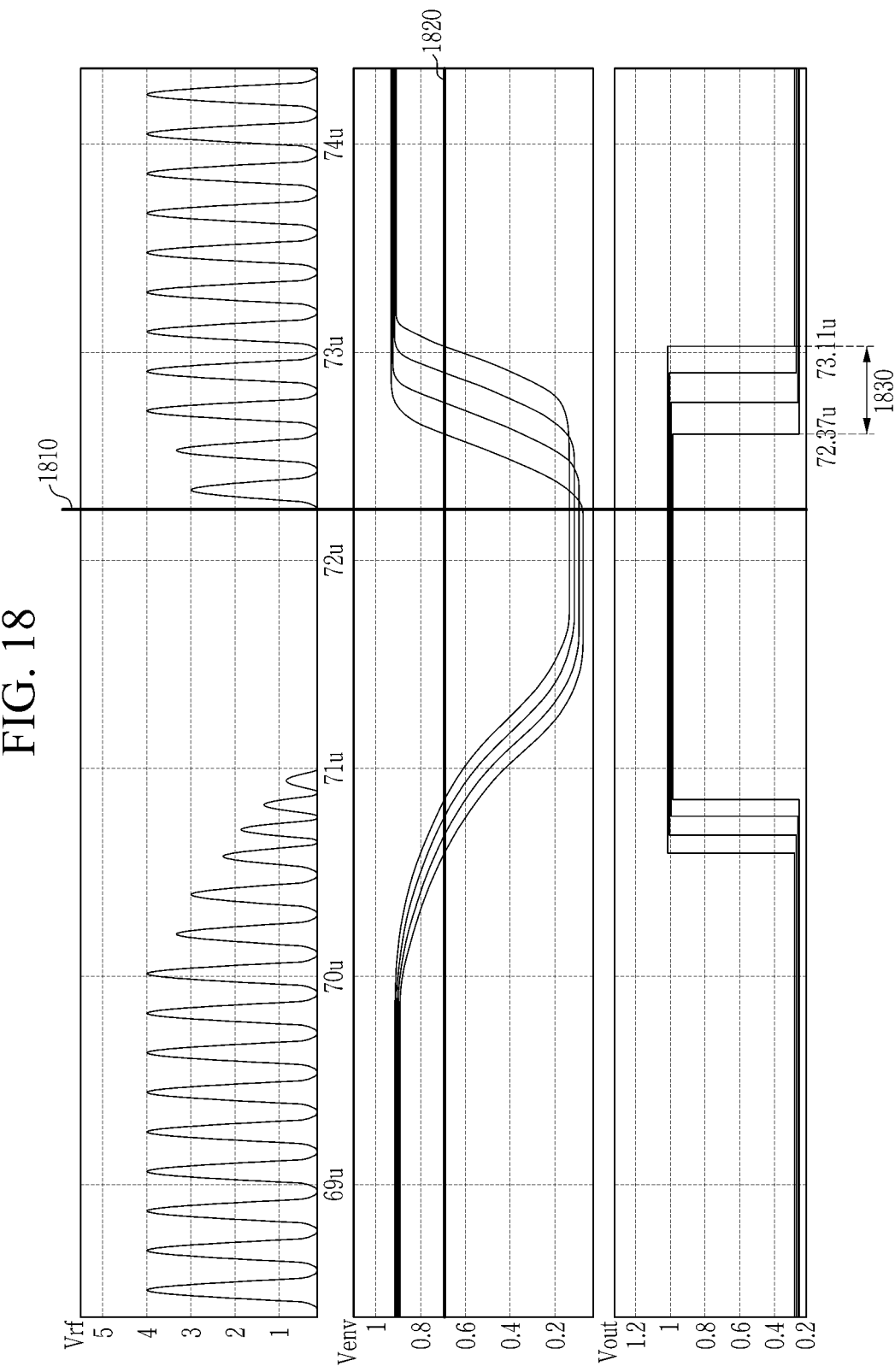
FIG. 18 illustrates a simulation result graph of a deviation of a starting point of a FDT detected in a reception circuit of a related smart card, according to an embodiment.
Figure 20:
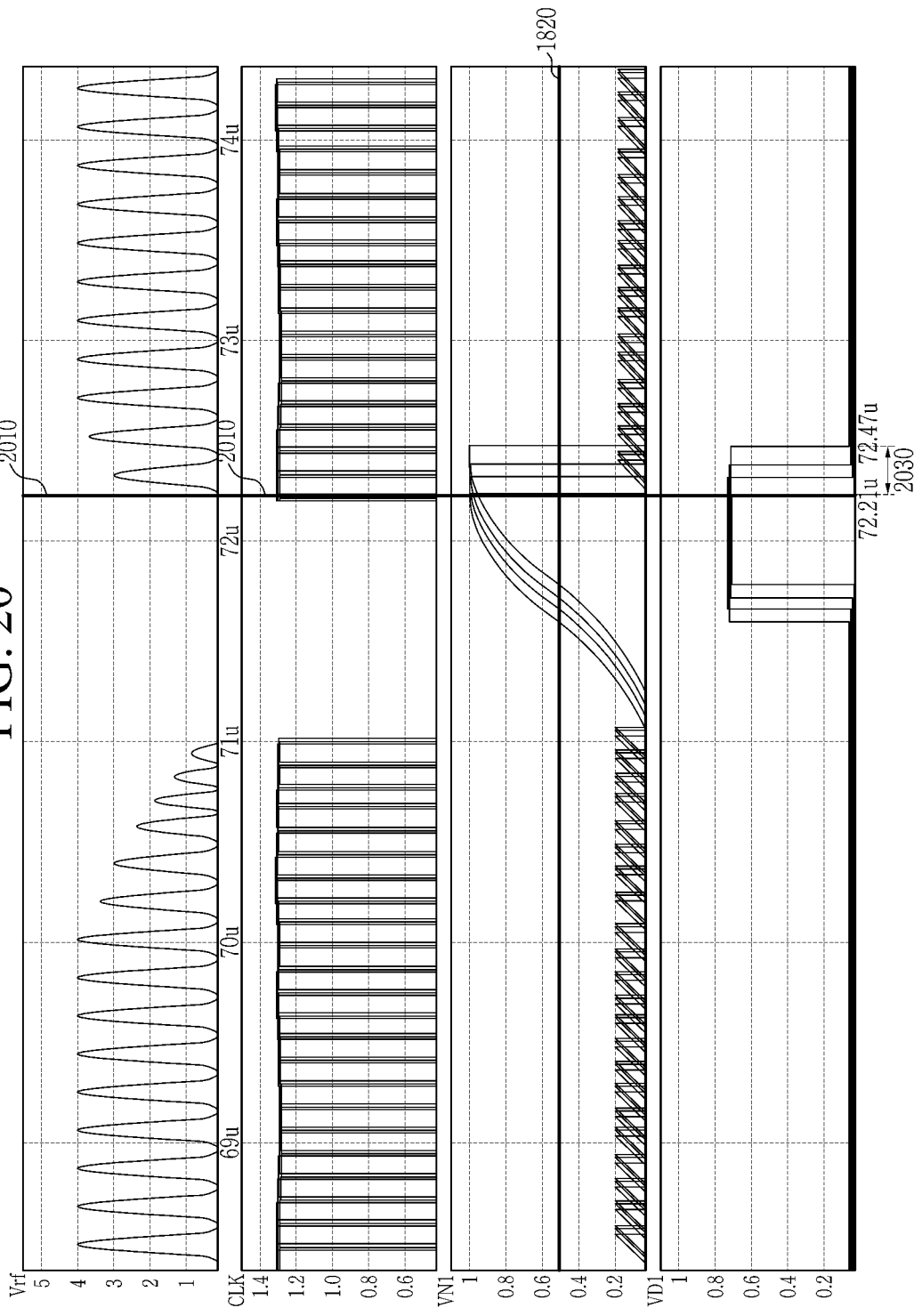
FIG. 20 illustrates a simulation result graph of a deviation of a starting point of a FDT detected in a reception circuit of a smart card, according to an embodiment.

FIG. 18 illustrates a simulation result graph of a deviation of a starting point of a FDT detected in a reception circuit of a related smart card, according to an embodiment. FIG. 20 illustrates a simulation result graph of a deviation of a starting point of a FDT detected in the reception circuit of a smart card, according to an embodiment.

The ISO/IEC 14443 standard may specify the FDT according to the command type and/or the logic level of the last transmitted data bit. For example, the ISO/IEC 14443 standard may specify that the deviation of the FDT may not exceed 0.4 microseconds (µs) from the FDT value specified in the ISO/IEC 14443 standard. That is, the starting point of the FDT detected from the reception circuit of the smart card may not exceed 0.4 µs from the starting point of the actual FDT.

Referring to FIG. 18, the waveforms of the ASK RF signal Vrf, the envelope voltage signal Venv, and the comparison signal Vout of a related smart card are illustrated. That is, the envelope signal Venv may be generated by the reception circuit 1600 of the related smart card according to the ASK RF signal Vrf transmitted from the related card reader to the related smart card, and the comparison signal Vout may be outputted by the reception circuit 1600 of the related smart card by comparing the envelope voltage signal Venv and the reference voltage 1820.

For example, as shown in FIG. 18, when the starting point 1810 of the actual FDT of the ASK RF signal Vrf is 72.21 µs, the deviation 1830 of the starting point of the FDT detected from the comparison signal Vout may range from 72.37 µs to 73.11 µs. That is, the deviation of the starting point of the FDT detected from the reception circuit 1600 of the related smart card may exceed 0.4 µs from the starting point of the actual FDT.

Referring to FIG. 20, simulated waveforms of the ASK RF signal Vrf, the clock signal CLK, the node voltage VN1, and the synchronization signal VD1 are illustrated. That is, the clock signal CLK may be generated according to the ASK RF signal Vrf transmitted from the card reader 110 to the smart card 120. The node voltage VN1 may be generated according to the logic level of the clock signal CLK. The synchronization signal VD1 may be outputted by comparing the node voltage VN1 and the reference voltage 2020.

For example, as shown in FIG. 20, when the starting point 2010 of the actual FDT of the ASK RF signal Vrf is 72.21 µs, the deviation 2030 of the starting point of the FDT detected from the synchronization signal VD1 may range from 72.21 μs to 72.47 μs. That is, the deviation of the starting point of the FDT detected from the reception circuit of the smart card 120 may not exceed 0.4 μs from the starting point of the actual FDT.

Figure 21:
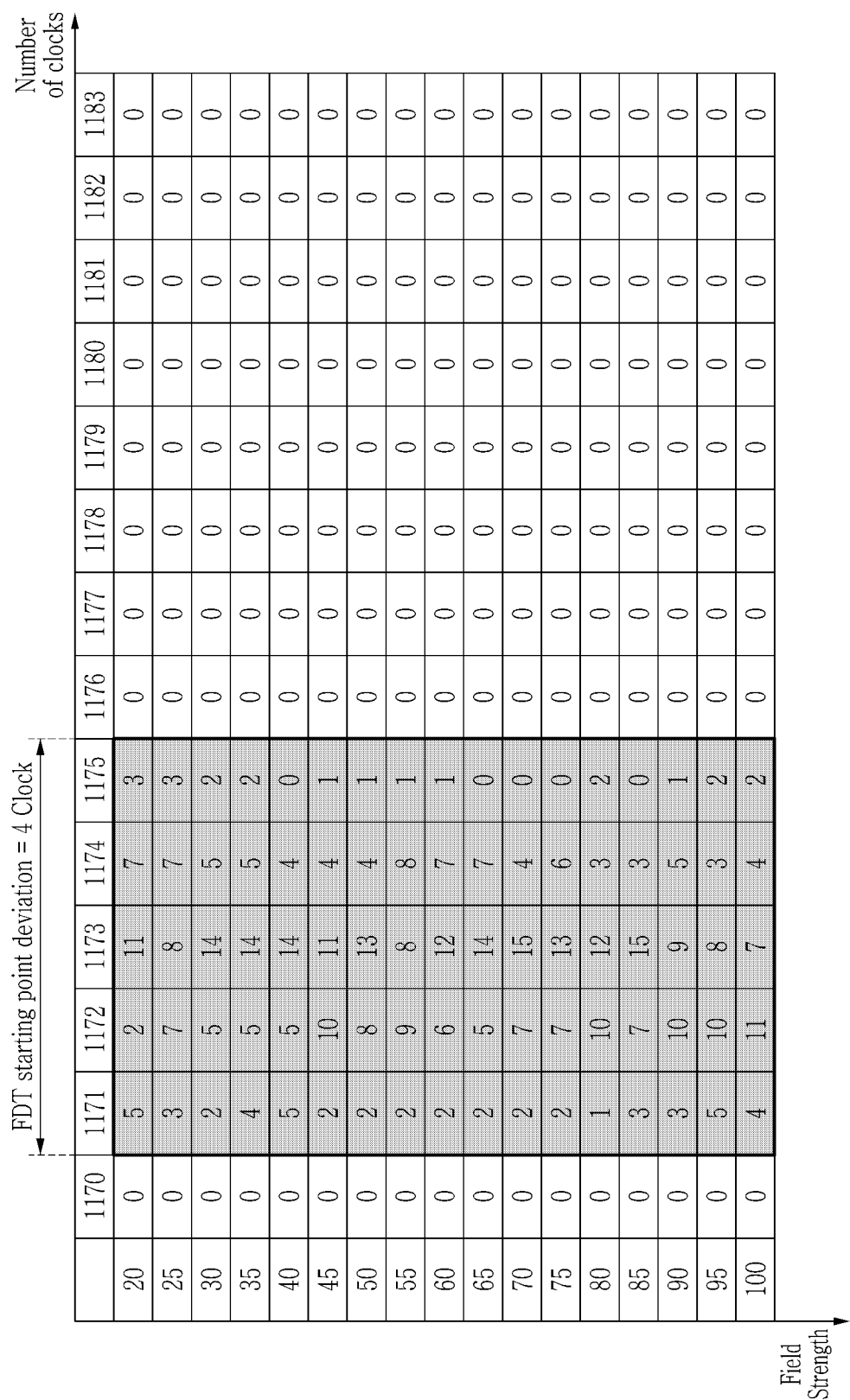
FIG. 21 illustrates data obtained by measuring a deviation of a starting point of a FDT detected in a reception circuit of a smart card, according to an embodiment.

FIG. 19 illustrates data obtained by measuring a deviation of a starting point of a FDT detected in a reception circuit of a related smart card, according to an embodiment. FIG. 21 illustrates data obtained by measuring a deviation of a starting point of a FDT detected in the reception circuit 1000 of the smart card 120, according to an embodiment.

Referring to FIG. 19, deviation data of the reception circuit 1600 of the related smart card is illustrated. The deviation data may be obtained by measuring the deviation of the starting point of the FDT according to the waveform of the ASK RF signal Vrf detected by the reception circuit 1600 of the related smart card when the reference voltage Vref is fixed to a specific value. As shown in FIG. 19, there is a period in which the deviation of the starting point of the FDT exceeds 0.4 μs according to the waveform of the ASK RF signal Vrf (e.g., a period after the 1177 clock).

Referring to FIG. 21, deviation data of the reception circuit 1000 of the smart card 120 is illustrated. The deviation data may be obtained by measuring the deviation of the starting point of the FDT according to the waveform of the ASK RF signal Vrf detected by the reception circuit 1000 of the smart card 120 according to embodiments of the present disclosure when the reference voltage VREF is fixed to a specific value. As shown in FIG. 21, the deviation of the starting point of the FDT may not exceed 0.4 μs, regardless of the waveform of the ASK RF signal Vrf. That is, the reception circuit 1000 may meet the deviation range of 0.4 μs (e.g., all values satisfy the range within the 1176 clock).

As described in FIGS. 18 to 21, the deviation of the starting point of the FDT detected by the reception circuit 1000, according to embodiments of the present disclosure, may be smaller than the deviation of the starting point of the FDT detected by the reception circuit 1600 of the related smart card. Consequently, embodiments of the present disclosure may conform to the ISO/IEC 14443 standard.

That is, unlike the reception circuit 1600 of the related smart card in which the deviation of the FDT may vary, according to the reference voltage Vref, the communication environment, and/or the operation condition of the related card reader and/or the related smart card, in a non-conforming manner, the reception circuit 1000 of the smart card 120 may detect a FDT within a conforming deviation range regardless of the waveform of the radio signal transmitted from the card reader 110 and the reference voltage VREF through a change in the signal restoration structure.

Figure 22:
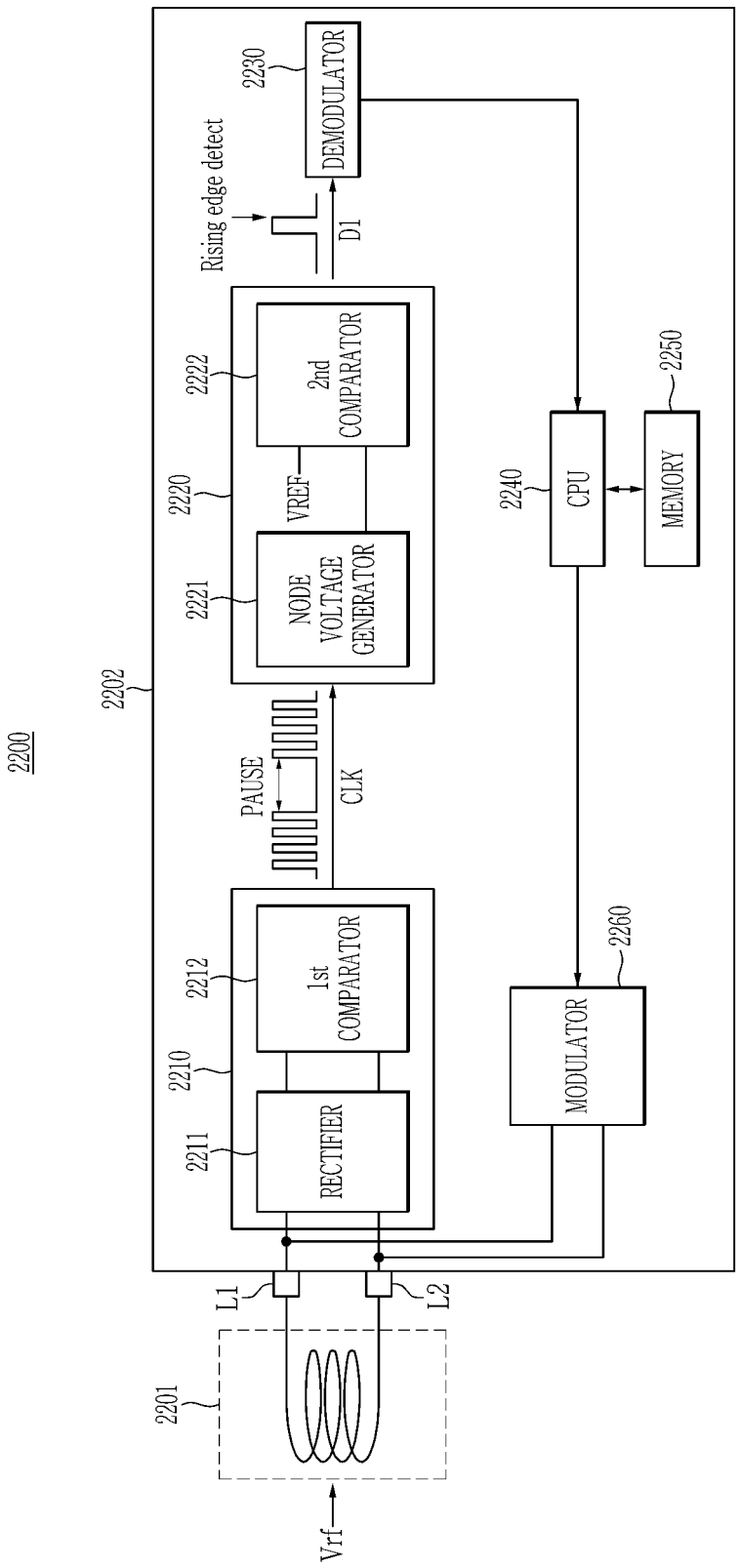
FIG. 22 illustrates a block diagram of a smart card, according to an embodiment.

FIG. 22 illustrates a block diagram of a smart card, according to an embodiment.

Referring to FIG. 22, a smart card 2200 may include an antenna 2201 and a smart card chip 2202 for transmitting and/or receiving wireless signals.

The smart card chip 2202 may include a clock recovery circuit 2210, a clock pause detector 2220, a demodulator 2230, a central processing unit (CPU) 2240, a memory 2250, and a modulator 2260.

The CPU 2240 may control an overall operation of the smart card chip 2202. For example, the CPU 2240 may control operation of the smart card chip 2202 during a reception operation and/or a transmission operation.

The clock recovery circuit 2210 may include a rectifier 2211 and a first comparator 2212. The clock pause detector 2220 may include a node voltage generator 2221 and a second comparator 2222.

During the reception operation, as described above with reference to FIGS. 1 to 21, the antenna 2201 may receive, from a card reader (e.g., card reader 110 of FIG. 1), a wireless signal Vrf that may include a plurality of pauses. The rectifier 2211 may be connected to the terminals L1 and L2 of the antenna 2201 and may rectify a voltage and/or current induced by the antenna 2201. The first comparator 2212 may receive an output signal from the rectifier 2211, and may output the clock signal CLK. The node voltage generator 2221 may receive the clock signal CLK. The second comparator 2222 may compare the output signal of the node voltage generator 2221 and the reference voltage VREF to output the synchronization signal D1 that may detect (and/or indicate) a rising edge of the last pause from among the plurality of pauses.

The demodulator 2230 may demodulate the synchronization signal D1 to generate a demodulation signal and provide the demodulation signal to the CPU 2240. The CPU 2240 may store the demodulation signal in the memory 2250.

During the transmission operation, the CPU 2240 may read output data from the memory 2250 to provide the output data to the modulator 2260. In an embodiment, the CPU 2240 may transmit output data to the card reader 110 within a predetermined period from the rising time point of the pause indicated by the synchronization signal D1. The modulator 2260 may modulate the output data and may provide the modulated signal to the terminals L1 and L2 of the antenna 2201. The antenna 2201 may transmit the output data to the card reader 110.

The reception circuit, and the smart card including the same, according to embodiments of the present disclosure, may efficiently perform a demodulation operation by reducing the influence of the operating environment through a change in the signal restoration structure.

In addition, the reception circuit, and the smart card including the same, according to embodiments of the present disclosure, may detect the rising starting point of a pause in a wireless RF signal, regardless of a change in the wireless signal, to implement a FDT with a small deviation, and thereby, potentially improving communication efficiency with the card reader.

In addition, the reception circuit, and the smart card including the same, according to embodiments of the present disclosure, may reduce the area of the related circuit and power consumption by restoring analog signals into digital signals in order to simplify the processing of the signals.

While example embodiments of the present disclosure have been described, it may be understood that the present disclosure is not limited to the example embodiments, and such, that the present disclosure is intended to cover various modifications and equivalent arrangements included within the spirit and scope of the appended claims.

What is claimed is:

1. A reception circuit of a smart card, comprising:
   a first circuit configured to:
      receive a wireless signal comprising a plurality of pauses; and
      restore the wireless signal to a clock signal; and
   a second circuit configured to:
      charge a voltage of a first node based on a first logic level of the clock signal;
      compare the voltage of the first node with a reference voltage of a first level; and
      output, based on the comparison of the voltage of the first node, a synchronization signal indicating a rising starting time point of a last pause of the plurality of pauses of the wireless signal, the last pause corresponding to an end bit of the wireless signal,
wherein the synchronization signal transitions from a first logic level to a second logic level at the rising starting time point of the last pause of the plurality of pauses and maintains the second logic level at rising starting time points of remaining pauses of the plurality of pauses.

2. The reception circuit of claim 1, wherein the first circuit comprises:
an antenna configured to receive the wireless signal;
a rectifier circuit coupled to respective ends of the antenna and configured to rectify signals outputted from the respective ends of the antenna; and
a first comparator coupled to the rectifier circuit, and configured to compare the rectified signals with each other and to output the clock signal based on the comparison of the rectified signals.

3. The reception circuit of claim 2, wherein the rectifier circuit comprises:
a first rectifier coupled between a first end of the antenna and a first input terminal of the first comparator; and
a second rectifier coupled between a second end of the antenna and a second input terminal of the first comparator,
wherein the first rectifier is configured to rectify a first signal outputted from the first end of the antenna,
wherein the second rectifier is configured to rectify a second signal outputted from the second end of the antenna,
wherein a first phase of the first signal is different from a second phase of the second signal, and
wherein the first comparator is configured to output the clock signal based on a first magnitude of a first output signal of the first rectifier and a second magnitude of a second output signal of the second rectifier.

4. The reception circuit of claim 1, wherein a first frequency of the clock signal is equal to a second frequency of the wireless signal.

5. The reception circuit of claim 1, wherein the second circuit comprises:
a first transistor comprising a first end electrically coupled to a voltage supply terminal, a gate configured to receive the clock signal, and a second end electrically coupled to the first node;
a second transistor comprising a first end electrically coupled to the first node, a gate configured to receive the clock signal, and a second end electrically coupled to a reference voltage supply terminal; and
a capacitor comprising a first electrode electrically coupled to the first node, and a second electrode electrically coupled to the reference voltage supply terminal.

6. The reception circuit of claim 5, wherein, based on the clock signal being at the first logic level, the first transistor is configured to be turned on, and the capacitor is configured to charge the first node with a charging voltage generated by a current flowing through the second end of the first transistor, and
wherein, based on the clock signal being at a second logic level, the second transistor is configured to be turned on, and the capacitor is configured to discharge the voltage of the first node to the reference voltage supply terminal through the second transistor.

7. The reception circuit of claim 6, wherein the first circuit is further configured to:
maintain the first logic level of the clock signal during the plurality of pauses of the wireless signal; and
transition the clock signal to the second logic level at a rising start point of each pause of the plurality of pauses of the wireless signal,
wherein the second logic level is different from the first logic level.

8. The reception circuit of claim 5, wherein the second circuit further comprises a second comparator configured to compare the voltage of the first node with the reference voltage, and to output an active level of the synchronization signal based on the voltage of the first node exceeding the reference voltage.

9. The reception circuit of claim 1, wherein the second circuit is further configured to:
charge the voltage of the first node at a constant change rate during the plurality of pauses, and
discharge the voltage of the first node at the rising starting time point of each pause of the plurality of pauses.

10. The reception circuit of claim 9, wherein the constant change rate is greater than a first value obtained by dividing the reference voltage by six (6) cycles of the clock signal, and
wherein the constant change rate is smaller than a second value obtained by dividing the reference voltage by half of a cycle of the clock signal.

11. The reception circuit of claim 1, wherein the first level of the reference voltage is greater than a second level at which the voltage of the first node is charged during half of a cycle of the clock signal.

12. A smart card, comprising:
an antenna configured to transmit a first wireless signal and receive a second wireless signal; and
a smart card chip configured to:
receive, from the antenna, the second wireless signal comprising a plurality of pauses;
output a clock signal based on the second wireless signal;
generate a node voltage based on a logic level of the clock signal;
compare the node voltage with a reference voltage of a first level;
output a synchronization signal that is activated based on whether the node voltage is greater than the reference voltage, the synchronization signal indicating a rising starting time point of a last pause of the plurality of pauses, the last pause corresponding to an end bit of the second wireless signal; and
demodulate the synchronization signal to generate a demodulation signal,
wherein the synchronization signal transitions from a first logic level to a second logic level at the rising starting time point of the last pause of the plurality of pauses and maintains the second logic level at rising starting time points of remaining pauses of the plurality of pauses.

13. The smart card of claim 12, wherein the smart card chip comprises:
a rectifier circuit coupled to respective ends of the antenna, and configured to rectify signals outputted from the respective ends of the antenna; and
a first comparator configured to output the clock signal by comparing magnitudes of the signals rectified by the rectifier circuit.

14. The smart card of claim 12, wherein the smart card chip comprises:
- a transistor comprising a source coupled to a voltage supply terminal, a drain coupled to a first node, and a gate configured to receive the clock signal, wherein the node voltage is a voltage of the first node;
- a capacitor electrically coupled to the first node, and configured to charge the node voltage based on a first logic level of the clock signal and to discharge the node voltage based on a second logic level of the clock signal; and
- a second comparator configured to output the synchronization signal by comparing the node voltage with the reference voltage.

15. The smart card of claim 12, wherein the smart card chip further comprises a modulator configured to generate a modulated signal by modulating output data, and to provide the modulated signal to the antenna, and
wherein the antenna is further configured to transmit the modulated signal during a predetermined time period from a time point at which the synchronization signal is outputted.

16. A smart card system, comprising:
a reader configured to transmit a wireless signal comprising a plurality of pauses; and
a smart card configured to:
  receive the wireless signal;
  restore the wireless signal to a clock signal; and
  output a synchronization signal indicating a rising starting time point of a last pause of the plurality of pauses based on the clock signal maintaining a first logic level during a predetermined period of time and transitions to a second logic level different from the first logic level, the last pause corresponding to an end bit of the wireless signal,
wherein the synchronization signal transitions from a third logic level to a fourth logic level at a rising starting time point of the last pause of the plurality of pauses and maintains the fourth logic level at rising starting time points of remaining pauses of the plurality of pauses.

17. The smart card system of claim 16, wherein the smart card is further configured to:
charge a node voltage during the predetermined period of time in which the clock signal is maintained at the first logic level,
discharge the node voltage based on the clock signal transitioning to the second logic level, and
compare the node voltage with a predetermined reference voltage.

18. The smart card system of claim 17, wherein the smart card is further configured to activate the synchronization signal based on the node voltage exceeding the predetermined reference voltage.

19. The smart card system of claim 17, wherein the smart card is further configured to charge the node voltage at a constant change rate,
wherein the constant change rate is greater than a first value obtained by dividing the predetermined reference voltage by six (6) cycles of the clock signal,
wherein the constant change rate is smaller than a second value obtained by dividing the predetermined reference voltage by half of a cycle of the clock signal, and
wherein a first level of the predetermined reference voltage is greater than a second level at which the node voltage is charged during half of the cycle of the clock signal.

* * * * *